US012620176B2

(12) United States Patent     (10) Patent No.:   US 12,620,176 B2

Rosca et al.     (45) Date of Patent:    May 5, 2026

(54) AUTOMATED AERIAL DATA CAPTURE FOR 3D MODELING OF UNKNOWN OBJECTS IN UNKNOWN ENVIRONMENTS

(71) Applicant: Siemens Corporation, Washington, DC (US)

(72) Inventors: Justinian Rosca, Princeton, NJ (US); Tao Cui, Princeton Junction, NJ (US); Naveen Kumar Singa, Plainsboro, NJ (US)

(73) Assignee: Siemens Corporation, Washington, DC (US)

( * ) Notice: Subject to any disclaimer, the term of this patent is extended or adjusted under 35 U.S.C. 154(b) by 111 days.

(21) Appl. No.: 18/695,971

(22) PCT Filed: Aug. 24, 2022

(86) PCT No.: PCT/US2022/041357
§ 371 (c)(1),
(2) Date: Mar. 27, 2024

(87) PCT Pub. No.: WO2023/064041
PCT Pub. Date: Apr. 20, 2023

(65) Prior Publication Data
US 2024/0404203 A1     Dec. 5, 2024

Related U.S. Application Data

(60) Provisional application No. 63/254,192, filed on Oct. 11, 2021.

(51) Int. Cl.
*G06T 17/20*     (2006.01)
*G01C 11/02*     (2006.01)
(Continued)

(52) U.S. Cl.
CPC .......... *G06T 17/205* (2013.01); *G01C 11/025* (2013.01); *G05D 1/689* (2024.01);
(Continued)

(58) Field of Classification Search
CPC . G06T 17/205; G06T 17/005; G06T 2200/08; G06T 2200/24; G06T 2210/56;
(Continued)

(56) References Cited

U.S. PATENT DOCUMENTS

2020/0019777 A1* 1/2020 Gurzoni, Jr. ......... G06V 10/803

FOREIGN PATENT DOCUMENTS

| CN | 109855627 A | * | 6/2019 |
| CN | 112327920 A | | 2/2021 |

OTHER PUBLICATIONS

Roberts Mike et al: "Submodular Trajectory Optimization for Aerial 3D Scanning";2017 IEEE International Conference on Computer Vision (ICCV), IEEE,Oct. 22, 2017 (Oct. 22, 2017), pp. 5334-5343, XP033283412.

(Continued)

*Primary Examiner* — Haixia Du

(57) ABSTRACT

System and method are disclosed for multi-phase process of automated data capture for photogrammetry and 3D model building of an unknown object (311) in an unknown environment. Planner module (152) generates a flight plan (413) for a camera drone (110) to fly autonomously on a flight path along a virtual polygon grid (302) defined above the target object (311) during a survey phase. Model builder computer (153) receives a point cloud dataset (321) captured by LiDAR sensor on camera drone (301) during survey flight and constructs low resolution 3D mesh (331) of the target object (311). Planner module (152) generates a flight path (413) for camera drone inspection phase with virtual waypoints surrounding the target object (311) at a marginal (Continued)

distance from the surface defined by the low resolution 3D mesh (331). Model builder (153, 163) builds a high resolution 3D model (422) of the target object (311) using photogrammetry processing of high resolution images captured by camera drone (411, 412) during inspection phase.

16 Claims, 4 Drawing Sheets

(51) Int. Cl.

| | | |
|---|---|---|
| *G05D 1/689* | (2024.01) | |
| *G05D 1/698* | (2024.01) | |
| *G05D 105/80* | (2024.01) | |
| *G05D 109/20* | (2024.01) | |
| *G06T 17/00* | (2006.01) | |

(52) U.S. Cl.
CPC ......... *G05D 1/6987* (2024.01); *G06T 17/005* (2013.01); *G05D 2105/87* (2024.01); *G05D 2109/20* (2024.01); *G06T 2200/08* (2013.01); *G06T 2200/24* (2013.01); *G06T 2210/56* (2013.01)

(58) Field of Classification Search
CPC .... G01C 11/025; G01C 15/002; G01C 21/20; G01C 11/00; G05D 1/689; G05D 1/6987; G05D 2105/87; G05D 2109/20; G06V 20/17
See application file for complete search history.

(56) References Cited

OTHER PUBLICATIONS

Hepp, Benjamin et al: "Plan3D", ACM Transactions on Graphics, ACM, NY, US, vol. 38, No. 1, Dec. 14, 2018 (Dec. 14, 2018), pp. 1-17, XP058685204.
Mansouri Sina Sharif et al: "Cooperative coverage path planning for visual inspection"; Control Engineering Practice., vol. 74, May 1, 2018 (May 1, 2018), pp. 118-131, XP093005071, GB.

* cited by examiner

AUTOMATED AERIAL DATA CAPTURE FOR 3D MODELING OF UNKNOWN OBJECTS IN UNKNOWN ENVIRONMENTS

STATEMENT REGARDING FEDERALLY SPONSORED DEVELOPMENT

Development for this invention was supported in part by Subaward Agreement No. ARM-TEC-19-04-F10 awarded by Advanced Robotics for Manufacturing Institute (ARM). The United States Government has certain rights in this invention.

TECHNICAL FIELD

This application relates to automated photography and photogrammetry. More particularly, this application relates to automated image collection for photogrammetry and 3D modeling of unknown objects in unknown environments.

BACKGROUND

Model building and photogrammetry is a process of obtaining 3-dimensional models of physical objects or environments through gathered images (RGB, IR), point cloud data, sensor positions, etc. of the physical objects or environments. It has a wide range of industrial applications such as digital twin modeling, structure inspection (buildings, power plants, wind turbine), equipment maintenance (ship, large vehicles/trains), geographical survey (e.g., google earth, construction planning, civil engineering) for obtaining reliable and accurate information about the environment and physical objects of interest.

Traditional model building and photogrammetry requires collecting images and other sensor (LIDAR, point cloud) data from various locations, with various perspective angles, and with sufficient overlaps, such that the collection of image and auxiliary data can fully "cover" the physical object of interest in 3D space. Then that data is used in an offline process to generate the 3D model, using photogrammetry software tools such as Bentley ContextCapture1 or other equivalent tools. The offline process typically takes hours or days in intensive computation, depending on the size of the model and the computational power of the host system. If the model generated from the photogrammetry tool does not satisfy the target requirements (typically because the data collected is not sufficient or is not of good quality), then another data collection process will be needed.

This traditional process is more of an "art" than a rigorous engineering process. Primarily a manual effort, the photos are taken manually by a photographer in a known environment. The photographer makes decisions as to how and where the pictures should be taken using human perception of the object and environment. The process is iterative and slow, as it relies on feedback from the offline modeling iterations lasting hours to days and reshooting photos to capture missing data.

In recent years, aerial robots such as drones have been added as a tool for the data acquisition in the model building process, extending the reach of the image data collection. In most the cases, the drone is used as a flying camera, but the process remains manual for the most part with the drone being manually operated by a human pilot or drone photographer. Furthermore, drones have introduced new problems regarding safety, with no assurance for improved the data quality. For example, controlling the drone properly and safely while collecting the images in an unknown environment is difficult. A human operator has trouble perceiving a flying object's location, especially as it moves further away in distance. The operator also needs to contend with safety, avoid collisions while the drone is close to the object under inspection, while navigating the mobile robot along a precise sweeping path. The image gathering quality requires precise poses and path overlaps while flying the drone around an unknown object that may have hidden obstacles. All of these challenges are magnified for modeling tasks involving supersized structures.

SUMMARY

System and method are disclosed with a multi-phase workflow for automated drone-based aerial data capture and a photogrammetry process for model building of unknown objects in unknown environments. During a survey phase, a camera drone autonomously obtains rough environment data in an online and safe manner. From this rough environment data, a low resolution 3D mesh of the target object is generated. In an inspection phase, a navigation plan is generated from the first phase information, and a camera drone autonomously executes a flight plan that ensures safety while capturing high quality images for a complete data set. Once all image data is retrieved, a model building phase involves employing a model builder computer with modeling software to generate a high resolution 3D model useful for digital twin applications.

Methods disclosed use aerial drones equipped with various sensors (e.g., LiDAR and camera) capable of inspecting a large outdoor structure. However, it can be applicable to a wider range of use cases and examples involving image data collection for model building.

BRIEF DESCRIPTION OF THE DRAWINGS

Non-limiting and non-exhaustive embodiments of the present disclosure are described with reference to the following FIGURES, wherein like reference numerals refer to like elements throughout the drawings unless otherwise specified.

DETAILED DESCRIPTION

Methods and systems are disclosed for automated data gathering related to 3D modeling of a target object with unknown spatial structure and/or an unknown environment. A multi-phase automated process includes waypoint planning for safe camera drone flight paths, pose and operation of the camera, collection of aerial image data with high quality and completeness via adequate image overlaps, and enabling improved quality in 3D models through photogrammetry of the obtained images, while accelerating the overall modeling process with fewer iterations.

The disclosed method and system is designed for modeling a target object in which either some information is available for the target object, or a worst case scenario in which there is no digital model available, minimal knowledge of geometry for the target object (i.e., limited to knowing the maximum length, width and height dimensions of the object for deriving a bounding box used as a drone flight safety zone), and/or no knowledge of the object's environment. For safety purposes, a human operator is required to be physically present near the object for oversight of automated aerial drone operation.

Figure 1:
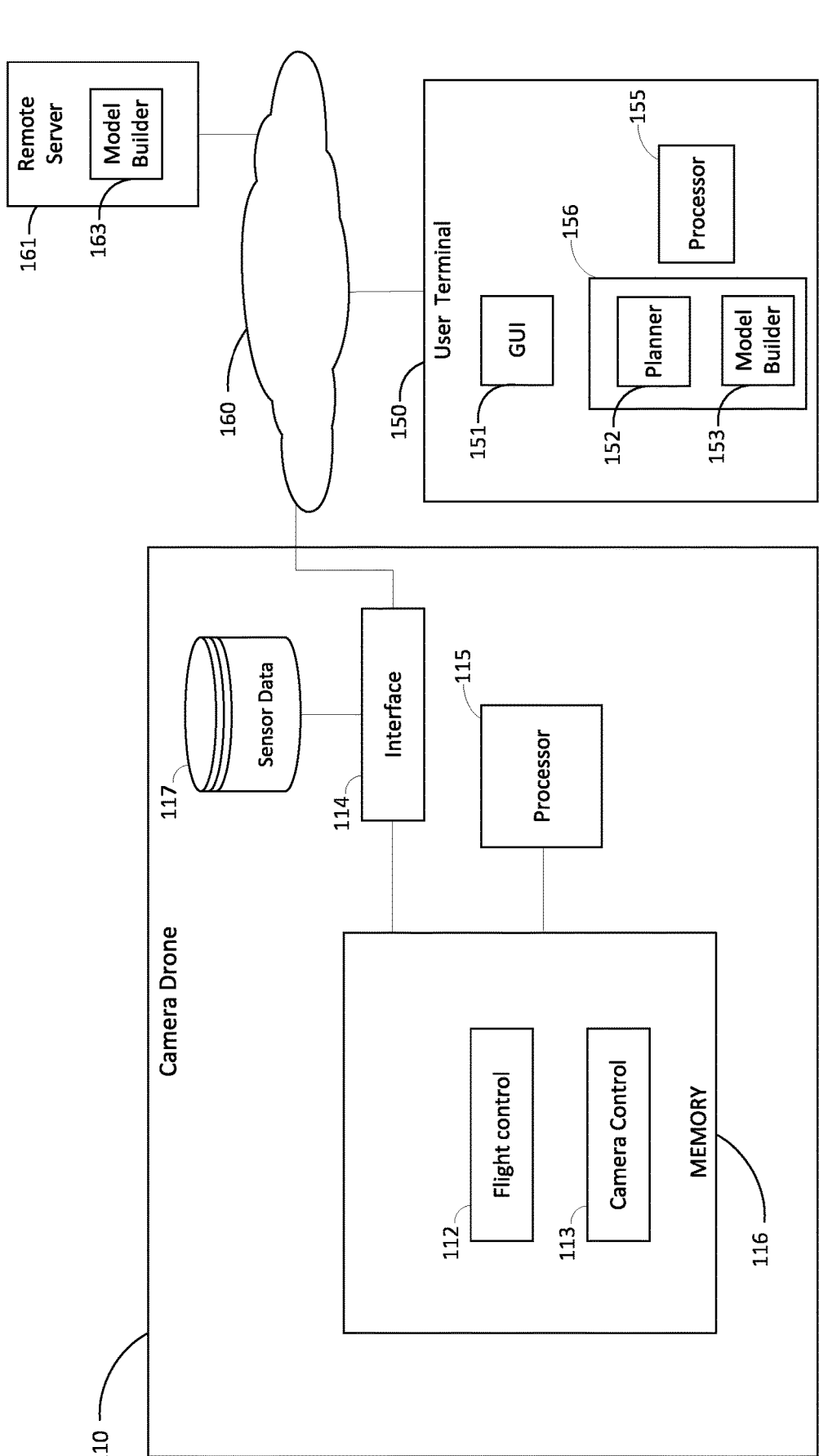
FIG. 1 illustrates an example of a computing environment within which embodiments of the disclosure may be implemented.

FIG. 1 shows an example of a computer environment within which embodiments of the disclosure may be implemented. A computing device 110 includes a processor 115 and memory 116 (e.g., a non-transitory computer readable medium) on which is stored various computer applications, modules or executable programs. In an embodiment, computing device 110 is installed in an aerial camera drone for automated flight path planning, flight control and camera control. Memory modules include flight control module 112 and camera control module 113.

Another computing device is shown implemented as a user terminal 150 configured to enable user inputs, generate flight plans and camera control plans, and for rendering intermediate and final 3D models of a target object. User terminal 150 includes a graphical user interface 151, a processor 155, and memory 156 having a planner module 152 and model builder computer 153. Planner module 152 generates flight plans and camera control plans which are transferred to flight control module 112 and camera control module 113 on board the camera drone computing device 110. Model builder computer 153 is configured as modeling software programs that can generate point clouds and low resolution 3D meshes using LiDAR datasets, and high resolution 3D models using photogrammetry of high resolution images. In some embodiments, model building is performed using model builder computer 163, which operates from a remote server 161 communicatively connected to user terminal 150 by network 160.

A network 160, such as a local area network (LAN), wide area network (WAN), or an internet based network, connects user terminal 150 to modules 112, 113 of computing device 110 via interface 114 for transmission of inputs and outputs.

Figure 2:
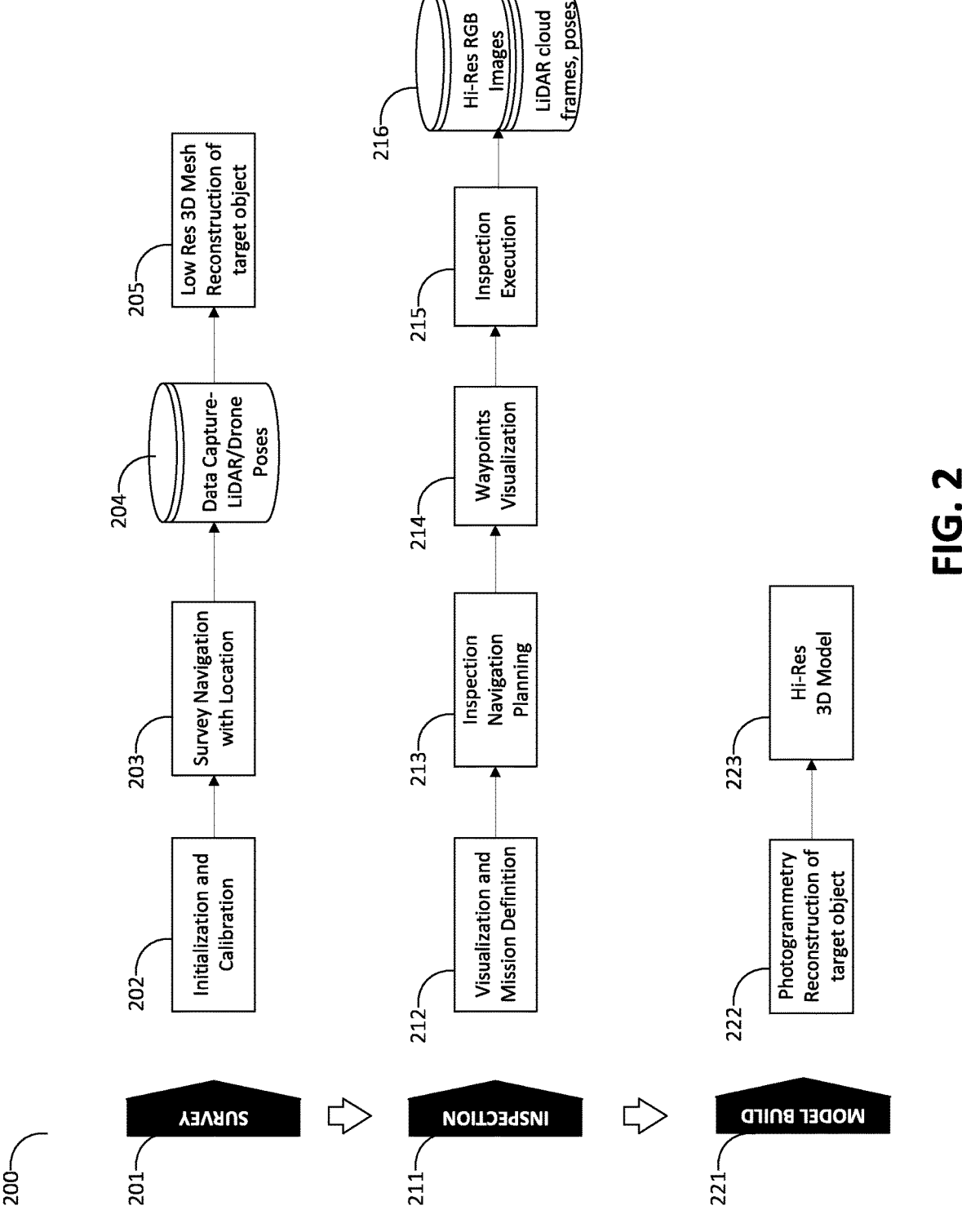
FIG. 2 shows a flowchart for an example of a multi-phase process of data collection and model building in accordance with embodiments of this disclosure.

FIG. 2 shows a flowchart for an example of a multi-phase process of data collection and model building in accordance with embodiments of this disclosure. Method 200 includes a survey phase 201, an inspection phase 211 and a model building phase 221. During survey phase 201, camera drone performs a rough scan of the target object using one or more mounted Light Detection and Ranging (LiDAR) sensors, flying at safe distance to obtain a low-resolution mesh (or spatial map) of the object and environment. Briefly, operation of a LiDAR unit involves laser light pulses emitted from a transmitter being reflected from the target object and detected by a receiver. The time of flight (TOF) for each bounced pulse is computed to derive a distance map.

At step 202, initialization and calibration for navigation is performed based on inputs entered at GUI 151. Input to planner module 152 includes the coordinates of a simple polygon that roughly covers an aerial outline of the target object at a safe distance above the object. For example, a virtual polygon grid may be defined by entering coordinates of at least two opposing corners (e.g., defining a 2D rectangular grid) in a coordinate space, situated parallel to a ground level surface, elevated at a safe height (e.g., 10-20 m above the object's maximum height observed by a human operator). As an example for coordinate entry, a selected geometric coordinate system is defined for the system, such as Global Positioning System (GPS) coordinates. The safe height value is defined at an elevation that ensures the camera drone will not collide with the target object. As LiDAR sensors can effectively operate well above the target object, a high altitude, far from any surface, can be set for the flight path to ensure a collision free survey. The dimensions of the polygon are defined to at least envelop the outline of the target object from above, and may include additional margin. While this example involves a simple rectangle, this is not limiting. The survey area may be of other shapes including but not limited to box, simple polygon, polyhedron, circle, oval, etc. An objective for the survey shape is to sufficiently constrain a survey flight to roughly the perimeter of the target object, restricting flight in an unknown environment in regions beyond the target object space to ensure safe operation of the camera drone.

Planner module 152 generates a flight path and action plan over the polygon grid, based on the characteristics of the particular LiDAR sensor(s). The path covers the entire object and the environment. As an example, Velodyne LiDAR with a 360 degree projection can be deployed on the camera drone. In an aspect, the mounted configuration of a LiDAR sensor is perpendicular to the heading of the camera drone, so when flying above an object, all the point cloud data (e.g., point cloud frames) containing the spatial information of the object below can be retrieved. Because the generated plan fully covers the object, it follows that a complete scan over the object is planned for execution by the one or more LiDAR sensors. The flight plan is transferred to the onboard flight control module 112 via interface 114.

At step 203, flight control module 112 executes navigation control for the survey mission, enabling camera drone to autonomously fly over the target object on the planned path. During flight, inspection data is stored at step 204 in sensor data storage 117. Captured LiDAR sensor data is stored as a point cloud dataset representative of spatial distances to the target object below the camera drone with respect to poses and location of the camera drone. Pose and location information may be tracked by one or more sensors attached to camera drone. As a safety measure, battery charge is continuously monitored, and upon a battery discharge alarm (e.g., <40% charge), camera drone immediately pauses the planned navigation and autonomously returns to the landing base for a battery exchange. With a fresh battery, the flight control module 112 controls the camera drone to resume the survey navigation from the paused location. Once the survey flight is completed, flight control module 112 controls the camera drone flight path for a return to a landing base where the captured survey data can be transferred from sensor data storage 117 to the user terminal 150. In different embodiments, the data transfer can be executed using removable memory (e.g., a memory card) for plug in to a user terminal port, via a hard wired connection (e.g., USB), or via a wireless communication connection via interface 114. At 205, model builder computer 151, 163 uses retrieved LiDAR data, pose data and location data to generate a coarse, low resolution 3D mesh of the target object, with the coarseness defined by an objective of fast rendering. As an example in which a massive object is to be surveyed (e.g., with a dimension 30 m to 100 m or more), the coarseness of the polygon mesh can be defined by the smallest dimension spanning 1 to 3 meters on the surface of target object (e.g., a polygon roughly 1 m×1 m to 3 m×3 m). Various methods can be used for this coarse mesh generation (e.g., voxgraph, oct-map, etc.). An advantage of generating just a coarse 3D mesh of target object is that the rendering time is significantly shorter than for a fine resolution model. A more detailed mapping is reserved for the later phases with more sophisticated image capture. The output of the survey phase 201 is a coarse, low resolution 3D mesh of target object, and may also include LiDAR point cloud frames, LiDAR pose data, and camera drone pose data.

Figure 3:
FIG. 3 illustrates an example sequence for surveying a target object in accordance with the embodiments of this disclosure.

FIG. 3 illustrates an example sequence for surveying a target object in accordance with the embodiments of this disclosure. A camera drone 301 is shown prepared to autonomously execute a flight path over unknown target object 311. Polygon grid 302 is defined by at least two opposing corners 303 and 304, having a width dimension that covers the maximum width of target object 311 plus additional margin to assure any all parts of the geometry, including lower side surfaces, are captured by LiDAR sensors when flying above. A LiDAR point cloud 321 is captured by the camera drone during execution of the survey flight plan. A post processing tool, such as a modeling software program of model builder computer 153 is used to generate a coarse low-resolution 3D mesh representation 331 as an intermediate model for the target object, which can be displayed on user interface 151 for marking regions of interest as inputs to the inspection phase 211. Alternatively, a 3D mapping of the point cloud 321 is generated for the coarse 3D representation of target object 311.

Returning to FIG. 2, based on the 3D mesh generation 205 from the survey phase 201, the inspection phase 211 generates a detailed flight plan and executes a flight path nearer to the target object for one or more camera drones to capture data related to aerial photo images. The inspection plan also plans and executes the camera pose and camera operation so that the target object can be fully captured by high-quality imagery with sufficient image overlap and other data for model building.

At step 212, the inspection phase is initialized by receiving inputs from the operator via GUI 151 including pixel resolution, overlapping requirements, mission time. Pixel resolution is based on camera specs, from which a recommended distance to the object can be obtained by planner 152. Overlapping requirements are based on model builder computer 153, 163 specs and/or camera specs, and mission time is based on a safety limit for battery discharge (i.e., time until discharge less a safety margin). Additionally, the operator may specify a portion of interest to be inspected by the current mission. For example, a boundary box may be drawn over the 3D mesh using GUI 151 to indicate the region of interest (i.e., a portion of the target object). In an embodiment, the region of interest may restrict the inspection to a portion of the target object. Alternatively or additionally, one or more regions of interest may be designated for defining an area on the target object that requires special attention for higher detailed (higher resolution) imagery. For such regions, planner 152 sets flight control plan and camera control plan accordingly. For example, defining denser flight path sweeping (i.e., more flight path sweeps within the region of interest relative to inspection outside the region of interest), more frequent image captures and higher pixel resolution can be planned to increase image overlapping for higher resolution in these regions of interest. Planner 152 also receives inputs that include the low resolution 3D mesh data in a common reference coordinate system, from which the flight plan and camera control plan is generated for a data acquisition path.

Based on the low resolution 3D mesh and operator inputs of step 212, planner module 152 performs inspection navigation planning at step 213. A flight path plan is developed for navigating nearer to the target object than during the inspection phase 201. The objectives for nearby path include: 1) ensuring safety by keeping the flight path at a safe distance from the exterior of the target object as estimated by the low resolution 3D mesh to prevent collision with target object; 2) plan the camera operation along the flight path so that acquired images meet the resolution and overlapping requirements; 3) ensuring other operation constraints being met, such as the battery discharge and mission time to prevent sudden power loss and ensuing crash of camera drone. In an embodiment, planner module 152 develops a set of virtual waypoints surrounding the target object representing coordinates along which the navigation path is to be routed. The waypoints may be derived using a global planner algorithm, a local planner algorithm, or a combination of both.

For the global planner, the geometry of the low resolution 3D mesh is processed using a passthrough filter to generate a set of rough perimeters stacked across several altitudes of the target object. Applying curve fitting, a stack of cross section curves is generated based on the rough perimeters. Next, each cross section curve is expanded to provide a safety margin for the camera drone. For example, an algorithm may add a fixed marginal distance to the stacked perimeters that permits high resolution image capture while keeping a safe distance from the target object (e.g., 1-5 meters). In an embodiment, a second low resolution 3D mesh is generated by adding the marginal distance onto the first low resolution 3D mesh. The expanded curves or mesh represent boundaries for camera drone orbit of the target object, from which virtual waypoints surrounding the target object for a global route are generated. For example, global planner calculates a number of sweeps necessary to cover defined waypoints within the region of interest and in accordance with minimum overlap requirements.

For the local planner, a voxel grid filter is applied to the low resolution 3D mesh to produce a sparse voxel octree representation of the target object. Next, a rapidly-exploring tree (RRT) algorithm is applied to the waypoints of the global route and rerouting of waypoints for avoiding any detected obstacles is performed. For example, while the global planner is based on rough perimeters, the sparse voxel octree rendering has higher detail that can detect any fine detailed protrusions of the target object beyond the rough perimeter curves that are potential collision hazards, which can then be addressed by rerouting waypoints as necessary by the RRT algorithm. In an embodiment for which only the local planner is implemented, a marginal distance is added to the low resolution 3D mesh points to generate an expended low resolution 3D mesh with a safety zone, the voxel grid filter is applied to the expanded 3D mesh, and the RRT algorithm generates a set of virtual waypoints on the surface of the expanded 3D mesh.

To achieve a more efficient inspection, two or more camera drones can be programmed to perform the inspection in a coordinated fashion as a swarm operation. In an embodiment, planner 152 develops a plan for inspection navigation at step 213 for a swarm formation. As an example, the swarm plan can implement a leader camera drone with multiple follower camera drones for inspection. To plan a swarm operation optimized for protection against collisions, the inspection space may be divided into equal portions, such as separate vertical tiers, each assigned to a respective camera drone.

While one camera drone is sufficient for inspection, a longer inspection duration must be planned for an embodiment with single camera drone inspection. A caveat with single camera drone inspection is that any requirements related to image acquisition having similar shade/illumination will be harder to achieve. For example, a navigation plan taking longer than one hour will produce images with different shadows as the sun moves across the sky, potentially resulting in knitting of incongruous images for the 3D model. In an aspect, a single drone nearby navigation plan may be defined to divide a region of interest into patches with shorter overlap passes.

At step 214, the flight navigation plan is rendered as a visualization of virtual waypoints and planned camera drone path connecting the waypoints along a sweeping course that provides more than the minimum required image overlap. In an aspect, the visualization is rendered for display to user at GUI 151.

With the inspection flight path defined by the planner module 152, the flight plan instructions are loaded into flight control module 112. Planner 152 loads camera control instructions to camera control module 113 based on inputs specifying pixel resolution and overlapping requirements. The inspection phase is executed at step 215, triggered by a launch signal that may originate from the operator at GUI 151 sending a launch command (e.g., a launch icon on the user terminal display or touchscreen) to one or more camera drones. For each camera drone deployed for the inspection mission, the flight control module 112 executes the detailed flight plan at step 215, enabling camera drone to fly at a short distance to the target object as define by the global planner and local planner to obtain the full coverage of high-resolution image and data, or to fly only to designated regions of interest, as dictated by the flight plan. The flight control and camera operation are fully automated, guided using GPS telemetry to follow the GPS-based waypoints and planned poses. However, per FAA regulation, a human pilot is present to supervise the camera drone operation and ready to take manual control, if necessary for safety reasons. In an embodiment, a live video feed from the camera on the camera drone may be displayed to the pilot, and/or one or more sensors may detect anomalies (such as deviation from the planned flight path, failure of camera operation or various drone components, battery discharge, or the like) and trigger alarms on a manual controller to alert the pilot for manual takeover.

For a swarm operation during inspection phase 211, the leader camera drone and follower camera drones form a formation of a swarm, which is a relative position of the leader and followers kept constant during flight. During take-off and landing, the leader and followers assume their respective positions in the order such that their paths never cross. In this way, the safety can be ensured. Given the formation of the swarm, the leader camera drone and the follower camera drones have different camera poses when capturing images. As such, the swarm can "enlarge" the picture coverage area. The leader and follower synchronize their positions at certain way point to keep the formation in sync so that the flight and photography are all performed in a predictive and consistent way. As an alternative embodiment for swarm operation, the planned flight path is divided and distributed among the camera drones, each to execute an assigned portion of the planned flight path.

The output for inspection phase 211 is high quality, well-planned imagery data (e.g., RGB, poses, coordinates) and other sensing data (e.g., LiDAR, IR if needed) 216 to be used for model building phase 221. For example, camera drone captures high resolution images (e.g., 300 dpi or greater) taken at a precise location to ensure the best quality, coverage and overlap. The level of high resolution depends on the camera resolution (e.g., HD, full HD, quad HD, 4K Ultra HD). The poses and coordinates of the images are also recorded and sync with the image as meta data for a photogrammetry process during model building phase 221.

Model building phase 221 at step 222 employs software that uses photogrammetry processing of the high resolution images to build the high-resolution 3D model at step 223. This type of software typically takes in the images, the camera poses, the point cloud data, together to generate the 3D model. The photogrammetry software is executed using modules of local model builder computer 153 running on user terminal 150, or modules of remote model builder computer 163 running on remote server 161. As an example of high-resolution definition, the polygon mesh with RGB data may have a smallest dimension in the range of 1 cm×1 cm to 10 cm×10 cm representation of target object surface.

Figure 4:
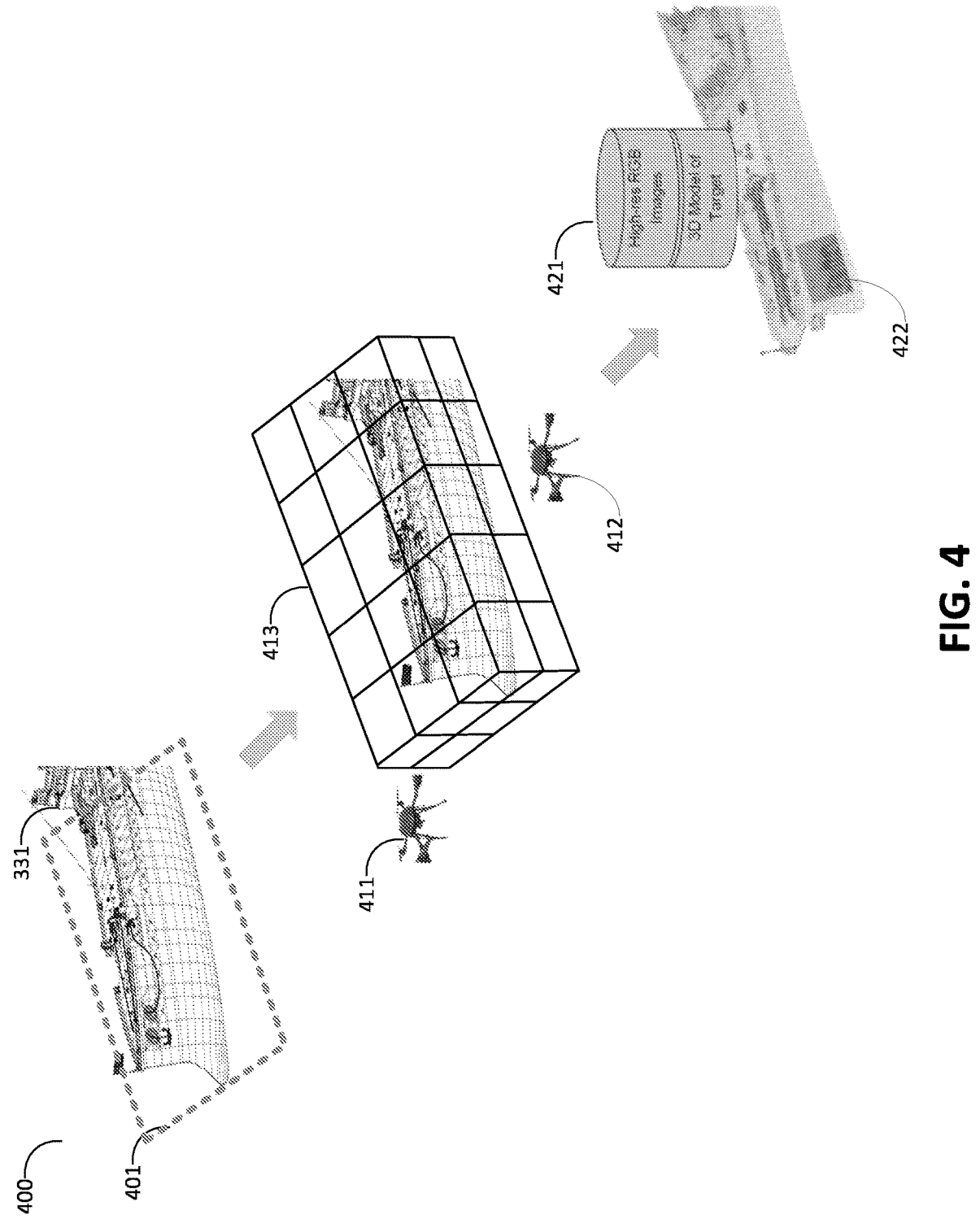
FIG. 4 illustrates an example sequence for inspection and model building phases in accordance with embodiments of this disclosure.

FIG. 4 illustrates an example sequence for inspection and model building phases in accordance with embodiments of this disclosure. As shown in process 400, the inspection phase is initiated using the GUI 151 by marking a region of interest 401 onto low resolution 3D mesh representation 331. Planner module 152 generates a 3D flight path 413 with virtual waypoints, with a separate flight path designated for each participating camera drone 411, 412. While virtual waypoint 413 is illustrated as a cubic pattern, other patterns may be generated based on optimization of flight time, useful for battery conservation. For example, an upward spiral-based pattern may be planned. Collected high resolution image data (e.g., RGB images) is stored in data bank 421. For the model building phase, model builder computer 153, 163 is used to generate high resolution 3D model 422, then stored in data bank 421.

The program modules, applications, computer-executable instructions, code, or the like depicted in FIG. 1 as being stored in the system memory 116 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 110, and/or hosted on other computing device(s) accessible via one or more of the network(s) 160, may be provided to support functionality provided by the program modules, applications, or computer-executable code and/or additional or alternate functionality. Further, functionality may be modularized differently such that processing described as being supported collectively by the collection of program modules depicted in FIG. 1 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 1 may be implemented, at least partially, in hardware and/or firmware across any number of devices.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device, partly on the computing device, as a stand-alone software package, partly on the computing device and partly on a remote computer or entirely on the computing device or server. In the latter scenario, the remote computer may be connected to the computing device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

It should further be appreciated that the computer system 110 may include alternate and/or additional hardware, software, or firmware components beyond those described or depicted without departing from the scope of the disclosure. More particularly, it should be appreciated that software, firmware, or hardware components depicted as forming part of the computer system 110 are merely illustrative and that some components may not be present or additional components may be provided in various embodiments. While various illustrative program modules have been depicted and described as software modules stored in system memory 116, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented multi-phase method for automated data capture for photogrammetry and model building of an unknown target object, comprising:

generating a point cloud dataset using data captured by at least one LiDAR sensor mounted to a camera drone flying autonomously on a survey flight path along a virtual polygon grid during a survey phase of operation, the virtual polygon grid defined at an altitude above the target object and situated parallel to a ground level surface;

constructing a low resolution 3D mesh of the target object based on the point cloud dataset, wherein the low resolution 3D mesh comprises polygons having a smallest dimension in a range of 1 meter×1 meter to 3 meters×3 meters on a surface of the target object;

generating an inspection flight path with virtual waypoints, each virtual waypoint lying on an offset surface created by uniformly expanding the low resolution 3D mesh by a predetermined distance in a range of 1 meter to 5 meters from the surface defined by the low resolution 3D mesh;

capturing images having a resolution of 300 dpi or greater from a camera mounted on the camera drone flying autonomously on the inspection flight path during an inspection phase; and building, by a model building computer, a 3D model comprising a polygon mesh with RGB data having a smallest dimension in a range of 1 centimeter×1 centimeter to 10 centimeters×10 centimeters of the target object using photogrammetry processing of the images having a resolution of 300 dpi or greater during a model building phase.

2. The method of claim 1, wherein the virtual waypoints are defined based on overlapping requirements by the model builder computer for stitching images in constructing the high resolution 3D model.

3. The method of claim 1, further comprising:
capturing poses and coordinates for each captured high resolution image;
wherein building the high resolution 3D model includes using the poses and coordinates.

4. The method of claim 1, further comprising:
capturing poses and coordinates with LiDAR sensor data during the survey phase;
wherein generating the low resolution 3D mesh includes using the poses and coordinates.

5. The method of claim 1, further comprising:
generating the flight path for two or more camera drones for a swarm operation during the inspection phase, wherein the flight path is divided and distributed among the two or more camera drones.

6. The method of claim 1, further comprising:
receiving input from a graphical user interface indicating a region of interest on the target object;
generating a flight control plan and camera control plan for capturing high resolution images having a resolution of 300 dpi or greater by defining denser inspection flight path sweeping, wherein the inspection flight path comprises virtual waypoints spaced at intervals of 1 to 5 meters from the surface of the target object, and increasing image overlapping to achieve at least 60% overlap between adjacent images.

7. The method of claim 1, wherein generating the inspection flight path further includes:
using a global planner algorithm to calculate a number of sweeps necessary to cover the virtual waypoints in accordance with minimum overlap requirements, wherein the global planner algorithm processes geometry of the low resolution 3D mesh using a passthrough filter to generate a set of perimeters stacked across several altitudes of the target object, each perimeter corresponding to a virtual waypoint path, and expands the perimeters by a safety margin in the range of 1 to 5 meters on which expanded perimeters the virtual waypoints are defined.

8. The method of claim 1, wherein generating the inspection flight path further includes:
expanding the low resolution 3D mesh by a safety margin in the range of 1 to 5 meters;
using a local planner algorithm to apply a voxel grid filter to the expanded low resolution 3D mesh to produce voxel octree representation of the target object, wherein the voxel octree comprises voxels with a minimum edge length of 1 meter, wherein a rapidly-exploring tree (RRT) algorithm is applied to generate the set of virtual waypoints and the inspection flight path along the virtual waypoints.

9. A system for automated data capture for photogrammetry and model building of an unknown target object, comprising:
a processor; and
a memory having modules stored thereon to perform instructions when executed by the processor, the modules comprising:
a planner module configured to:
generate a survey flight plan for a camera drone to fly autonomously on a survey flight path along a virtual polygon grid during a survey phase of operation, the virtual polygon grid defined at an altitude above the target object and situated parallel to a ground level surface;
a model builder computer configured to:
receive a point cloud dataset using data captured by at least one LiDAR sensor mounted to the camera drone; and
construct a low resolution 3D mesh of the target object based on the point cloud dataset, wherein the low resolution 3D mesh has a smallest dimension spanning 1 to 3 meters on a surface of the target object;
wherein the planner module is further configured to:
generate an inspection flight path with virtual waypoints surrounding the target object at a marginal distance from the surface defined by the low resolution 3D mesh, wherein the marginal distance is in a range of 1 to 5 meters; and
wherein the model builder computer is further configured to:
receive high resolution images of the target object captured from a camera mounted on the camera drone flying autonomously on the flight path during an inspection phase, wherein the images have a resolution of 300 dpi or greater; and
build a high resolution 3D model of the target object using photogrammetry processing of the high resolution images during a model building phase, wherein the high resolution 3D model comprises a polygon mesh with RGB data having a smallest dimension in a range of 1 cm x 1 cm to 10 cm x 10 cm.

10. The system of claim 9, wherein the virtual waypoints are defined based on overlapping requirements by the model builder computer for stitching images in constructing the high resolution 3D model.

11. The system of claim 9, wherein the model builder computer is further configured to:
receive captured poses and coordinates for each captured high resolution image; and
build the high resolution 3D model using the poses and coordinates.

12. The system of claim 9, wherein the model builder computer is further configured to:
receive captured poses and coordinates with LiDAR sensor data during the survey phase;
generate the low resolution 3D mesh using the poses and coordinates.

13. The system of claim 9, wherein the planner module is further configured to:
generate the inspection flight path for two or more camera drones for a swarm operation during the inspection phase, wherein the flight path is divided and distributed among the two or more camera drones.

14. The system of claim 9, wherein the planner module is further configured to:
receive input from a graphical user interface indicating a region of interest on the target object;
generate a flight control plan and camera control plan for capturing high resolution images having a resolution of 300 dpi or greater by defining denser inspection flight path sweeping, wherein the inspection flight path comprises virtual waypoints spaced at intervals of 1 to 5 meters from the surface of the target object, and increasing image overlapping to achieve at least 60% overlap between adjacent images.

15. The system of claim 9, wherein the planner module is further configured to:

use a global planner algorithm to calculate a number of sweeps necessary to cover the virtual waypoints in accordance with minimum overlap requirements, wherein the global planner algorithm processes geometry of the low resolution 3D mesh using a passthrough filter to generate a set of perimeters stacked across several altitudes of the target object, each perimeter corresponding to a virtual waypoint path, and expands the perimeters by a safety margin in the range of 1 meter to 5 meters, on which expanded perimeters the virtual waypoints are defined.

16. The system of claim 9, wherein the planner module is further configured to:

expand the low resolution 3D mesh by a safety margin in the range of 1 meter to 5 meters;

use a local planner algorithm to apply a voxel grid filter to the expanded low resolution 3D mesh to produce a voxel octree representation of the target object, wherein the voxel octree comprises voxels with a minimum edge length of 1 meter, wherein a rapidly-exploring tree (RRT) algorithm is applied to generate the set of virtual waypoints and the inspection flight path along the virtual waypoints.

* * * * *